United States Patent [19]

May

[11] 4,105,136

[45] Aug. 8, 1978

[54] SNAP-IN MOLDED COVER ASSEMBLY FOR ACCESS OPENING

[75] Inventor: William E. May, Feasterville, Pa.

[73] Assignee: Gould Inc., Rolling Meadows, Ill.

[21] Appl. No.: 763,304

[22] Filed: Jan. 28, 1977

[51] Int. Cl.² .................. B65D 51/04; B65D 51/18
[52] U.S. Cl. .................. 220/339; 220/254; 220/306
[58] Field of Search ............... 220/339, 337, 254, 306, 220/334, 241, 242, 63 R; 229/43; 206/455, 456

[56] References Cited

U.S. PATENT DOCUMENTS

| | | | |
|---|---|---|---|
| 2,403,287 | 7/1946 | Keith | 229/43 X |
| 3,113,693 | 12/1963 | Stull | 220/306 |
| 3,322,299 | 5/1967 | Foster | 220/306 |
| 3,469,732 | 9/1969 | Foster | 220/339 X |
| 3,566,946 | 3/1971 | MacDonald | 220/306 X |
| 3,777,094 | 12/1973 | Peters, Jr. | 220/63 R X |
| 3,998,354 | 12/1976 | Song | 220/339 X |

*Primary Examiner*—William Price
*Assistant Examiner*—Steven M. Pollard
*Attorney, Agent, or Firm*—Ostrolenk, Faber, Gerb & Soffen

[57] ABSTRACT

The metal door of metal-cald or metal-enclosed switchgear has a rectangular access opening. The access opening is closed by a molded snap-in cover assembly which includes an integral frame which contains a peripheral flange. A raised annular bead is spaced from the flange and defines, with the flange, an annular channel to permit the flange to snap into the exposed edges of the opening in the metal door. The frame has an integrally hinged cover member which can be closed over the frame to close the access opening.

11 Claims, 9 Drawing Figures

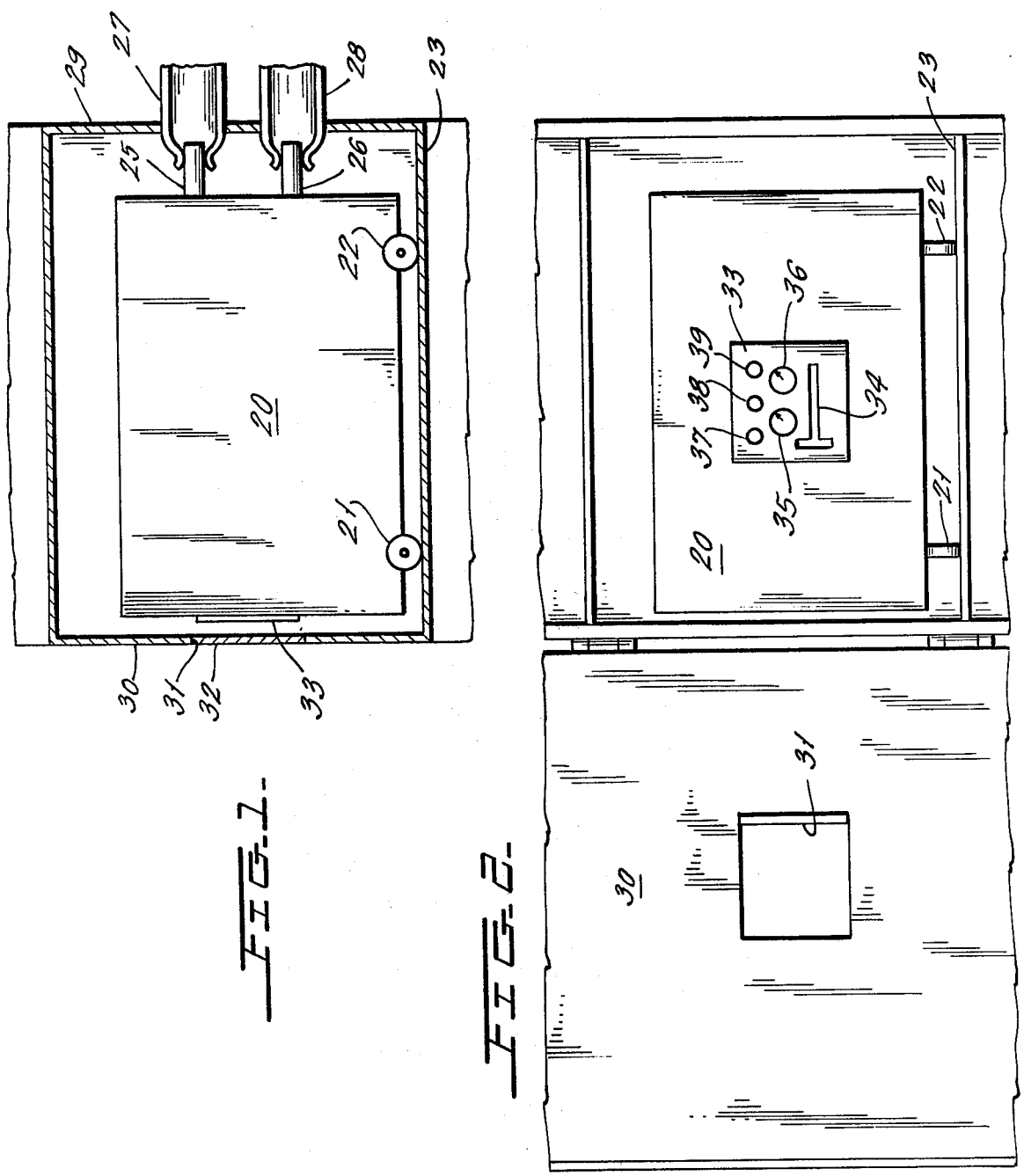

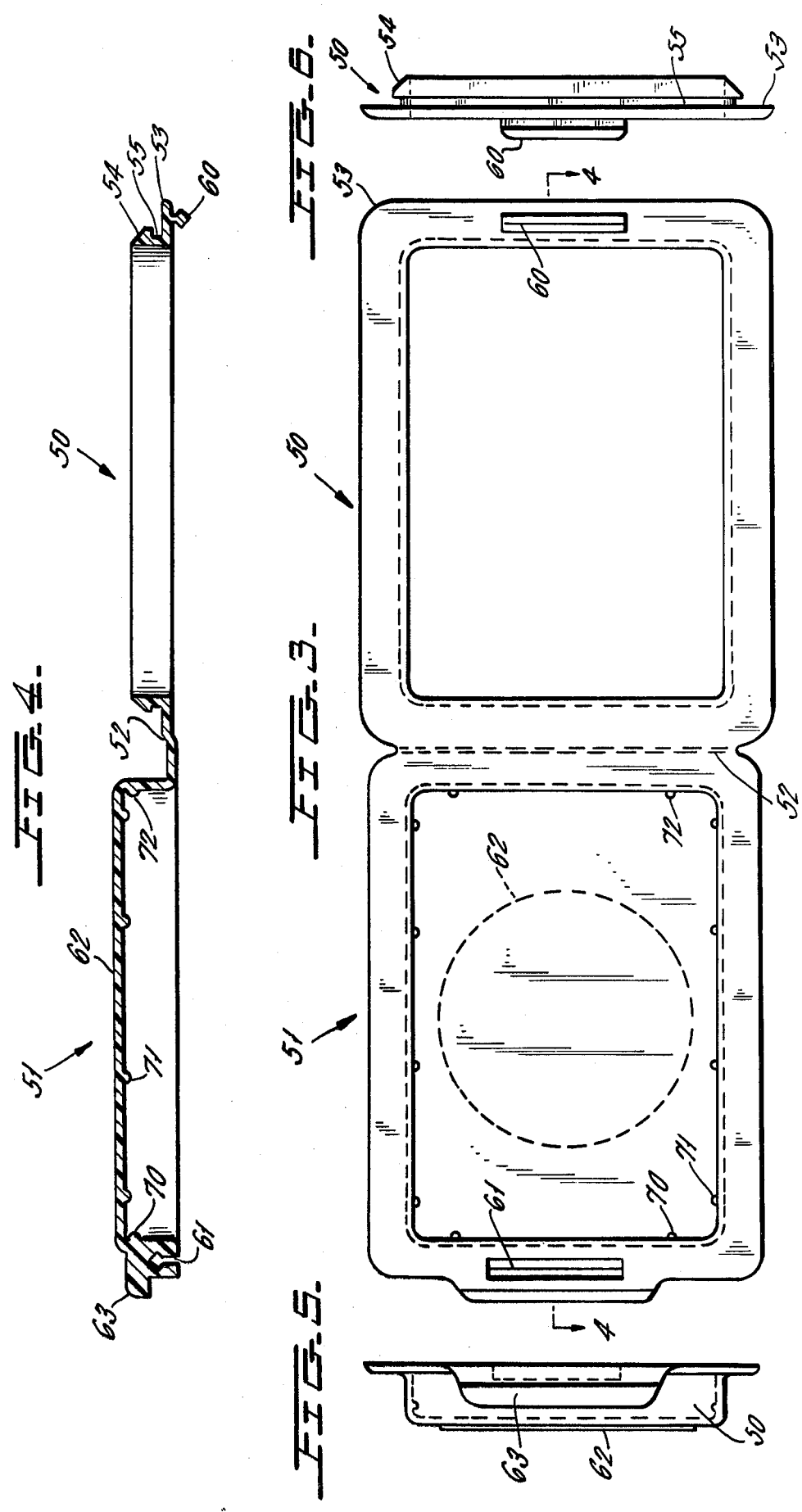

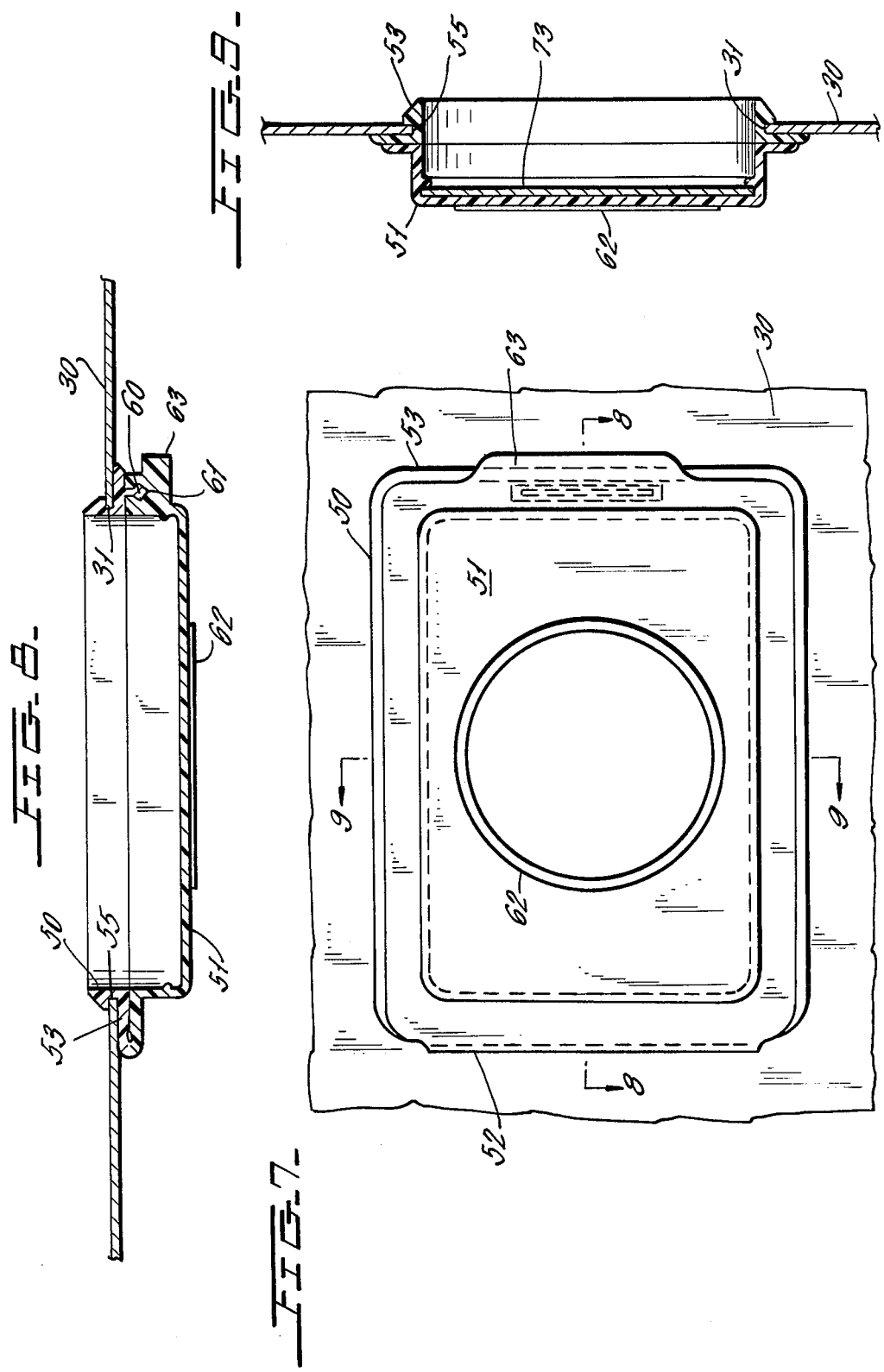

SNAP-IN MOLDED COVER ASSEMBLY FOR ACCESS OPENING

BACKGROUND OF THE INVENTION

This invention relates to switchgear housings, and more specifically relates to a novel closure for an access opening in the steel door of a switchgear housing wherein the closure consists entirely of a snap-in molded assemblage.

Metal-clad and metal-enclosed switchgear are well known and usually consist of steel cubicles having steel closure doors for enclosing circuit breakers and other electrical equipment. The circuit breakers which are enclosed in the housing carry operation indicators, counters, racking mechanisms, and the like, and personnel must have access to this equipment.

One prior art method of providing such access is simply to open the steel cubicle door so that the entire interior of the cubicle is exposed. This arrangement has the disadvantage of requiring the user to open a large compartment door while a power circuit breaker is closed if only to read a meter or counter or the like. In addition to the inconvenience of having to open the entire compartment door for this relatively minor task, it is possible that the power circuit breaker will operate while the door is open, thereby exposing the operator to a possibly dangerous condition.

Another known method for making the controls and indicator on the circuit breaker accessible to an operator uses an escutcheon on the movable circuit breaker, where the escutcheon carries all of the necessary indicators and operating controls and protrudes through an opening in the steel compartment door. This arrangement is relatively expensive and, moreover, when the circuit breaker is racked to its disconnected position and is in its most forward position relative to the cubicle, the circuit breaker controls extend beyond the front door and into the aisle space.

Another method which has been used in the past included the use of a rectangular opening in the steel compartment door with a metal front access door with separate clasp and hinge for closing this access opening. With this arrangement, when the access door is open, the opening in the main steel door can present sharp edges and burrs which can be hazardous to personnel. Moreover, the access door of this construction is relatively expensive. Access doors have also been provided of a sliding variety but these are also expensive and the relatively sharp and possibly burred opening in the main steel door is exposed when the access door is open.

BRIEF DESCRIPTION OF THE PRESENT INVENTION

In accordance with the present invention, a novel molded assembly is provided which consists of an open frame which can snap into an access opening in the main steel compartment door, and a cover which is integral with the frame which can open or close the frame opening, in order to allow easy access to the circuit breaker racking mechanism, the circuit breaker controls, and any indicator which may be mounted on the circuit breaker. In addition, the opening permits easy inspection of the interior of the circuit breaker cubicle without having to open the main cubicle door. The snap-in assemblage of the invention can consist of a unitary molding of any suitable plastic material such as polypropylene or polyethylene. Moreover, the frame contains a flange which can snap around the access door opening, thereby to prevent personnel from being injured due to sharp edges or burrs in the access opening. Note further that the access opening can now be cut in the door but need not be smoothed or polished to any great extent because of the subsequent protection to be provided by the snap-in cover which will cover sharp edges and burrs. Another advantage of the present invention is that the hinge and clasp for connecting the closure to the frame can be molded integrally with the assembly. It is also possible to mold the manufacturer's logotype directly on the plastic door, thus doing away with the need for providing a separate logotype elsewhere on the panel. It will also be clear that the molded access door assembly can be easily installed without need for special tools.

BRIEF DESCRIPTION OF THE DRAWINGS

FIG. 1 is a schematic cross-sectional view of a metal switchgear enclosure which contains a schematically illustrated circuit breaker therein.

FIG. 2 is an elevation view of the left-hand side of the cubicle of FIG. 1 with the cubicle door open to expose the circuit breaker and its operating controls and indicators.

FIG. 3 is a plan view of the molded snap-in cover assembly of the present invention with the cover in an open position.

FIG. 4 is a cross-sectional view of FIG. 3 taken across the section line 4—4 in FIG. 3.

FIG. 5 is an end view of the left-hand end of the assembly of FIG. 3.

FIG. 6 is an end view of the right hand end of the cover assembly of FIG. 3.

FIG. 7 shows the cover assembly of FIGS. 3 to 6 with the cover closed and with the assembly snapped into the access opening of a circuit breaker cubicle door.

FIG. 8 is a cross-sectional view of FIG. 7 taken across the section line 8—8 of FIG. 7.

FIG. 9 is a cross-sectional view of FIG. 7 taken across the section line 9—9 in FIG. 7.

DETAILED DESCRIPTION OF THE DRAWINGS

Referring first to FIGS. 1 and 2, there is schematically illustrated a portion of a switchgear assembly which may be either metal-clad or metal-enclosed switchgear. In FIG. 1 a circuit breaker 20 is schematically illustrated as being mounted on wheels 21 and 22 which roll on a base 23 within the switchgear cubicle. Note that circuit breaker 20 can be mounted for movement within its cubicle in any desired manner including wheel mounting, cradle mounting or any other desired arrangement. The circuit breaker 20 will then have primary disconnect contacts 25 and 26 which engage cooperating section disconnects 27 and 28 which may be fixed on the rear wall 29 of the steel cubicle illustrated.

The cubicle shown for FIGS. 1 and 2 is enclosed by a steel door 30 which is shown in a closed position in FIG. 1 and in an open position in FIG. 2. The steel door 30 is provided with an access opening 31 which is shown open in FIG. 2 and closed in FIG. 1 by the access door 32. The access door 32 is aligned with control and indicator region 33 of the circuit breaker 20. Region 33 will contain equipment such as a conventional racking handle 34 (FIG. 2), operating counters or instruments 35 and 36 and control push buttons 37, 38 and 39. The illustration of the control and indicator region 33 is purely schematic and may take any desired form.

It is desirable to gain access to region 33 without having to open main steel door 30. FIGS. 3 to 9 illustrate the novel molded cover of the present invention which provides a closure for access opening 31 in door 30.

FIG. 3 to 6 illustrate the novel molded cover in an open position. As shown in these figures, the cover consists of a frame portion 50 and a cover portion 51 which are integrally and flexibly joined together along a reduced thickness integral hinge region 52. The frame portion 50 contains a flange region 53 and an annular bead 54 spaced from the flange 53 to define an annular channel 55. The annular channel 55, as will be later described, snaps onto the edge of the opening 31 in the door 30. Bead 54 preferably has sloping edge surfaces to enable the frame 50 to be forced into the steel door opening, with the bead 54 snapping into the opening to hold the surface of flange 50 against the door.

Frame 50 is also provided with a wedge-shaped boss 60 which will cooperate with and snap into a wedge-shaped slot 61 in the cover section 51 to serve to hold the cover in its closed position.

The cover section 51 is a continuous cover and may contain a raised region 62 for receiving an identifying logotype which might identify the manufacturer of the equipment. Cover section 61 may also contain a protruding handle 63 to enable one to conveniently grip the door 51 in order to operate the door between its open and closed positions.

As further shown in FIGS. 3, 4 and 9, the interior of cover 51 may contain projecting dimples, such as dimples 70, 71 and 72, which can hold a thin steel inner barrier plate 73 (FIG. 9) beneath the cover 51.

FIGS. 7, 8 and 9 show the cover assembly of the invention snapped into opening 31 of door 30 of FIG. 2. It will be noted, particularly in FIGS. 8 and 9, that the edges of door opening 31 is nested within slot 55 of the frame 50. Thus, the edges of the opening 31 are covered by a relatively soft frame member 50, which may be of relatively flexible molded polypropylene, and the cover assembly is held securely within position within the door 30.

In order to close the cover, the user simply grasps handle 63 and then rotates cover 61 around its hinge 52 and causes the wedge-shaped slot 61 to snap over the wedge-shaped boss 60. This will then hold the cover 51 closed over the frame 50 and thus over the opening 51 in door 30. In order to gain access to the interior of circuit breaker cubicle, the operator simply pulls handle 63 outwardly to force the disconnection between wedge-shaped boss 60 and slot 61 and cover 51 is pivoted around its integral hinge 52 to expose region 33 of the circuit breaker.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. An integral molded cover and frame for the access opening of a circuit breaker cubicle; said frame comprising a generally flat ring-shaped flange having a first surface for sealing against a flat peripheral region extending from said access opening, and an annular projection axially spaced from said flange and defining, with said first surface of said flange, an annular groove which can snap around the periphery of said access opening; said flange of said frame having a second surface; an integral hinge connecting one edge of said molded cover to one edge of said frame; said cover having an annular ring-shaped flange surface engageable in surface-to-surface, non-telescoping contact with said second surface of said flange of said frame; said cover being rotatable around said hinge between an open and closed position relative to said frame; said cover being coextensive with said frame; said cover terminating completely at its said flat ring-shaped surface; and snap closure means for holding said cover in its said closed position; said frame and said cover having generally rectangular shapes; said snap closure means being disposed only on the side of same frame which is farthest removed from said hinge.

2. The integral molded cover and frame of claim 1 wherein said integral hinge comprises a reduced thickness region of the molded material at the junction between said cover and frame.

3. The integral molded cover and frame of claim 1 wherein the material used for said frame is a relatively flexible plastic.

4. The integral molded cover and frame of claim 1 wherein said annular projection has a cam-shaped outer periphery to assist in forcing said projection into said access opening.

5. The integral molded cover and frame of claim 1 wherein said cover has an extending handle section on the side of said cover opposite said hinge.

6. The integral cover and frame of claim 1 wherein said closure means consists of a wedge-shaped boss connected to one of said frame or cover and a cooperating wedge-shaped slot in the other of said frame or cover.

7. The integral cover and frame of claim 1 which includes a metal barrier plate secured to the interior surface of said cover.

8. The integral molded cover and frame of claim 3 wherein said integral hinge comprises a reduced thickness region of the molded material at the junction between said cover and frame.

9. The integral molded cover and frame of claim 8 wherein said annular projection has a cam-shaped outer periphery to assist in forcing said projection into said access opening.

10. The integral molded cover and frame of claim 9 wherein said cover has an extending handle section on the side of said cover opposite said hinge.

11. The integral cover and frame of claim 9 wherein said closure means consists of a wedge-shaped boss connected to one of said frame or cover and a cooperating wedge-shaped slot in the other of said frame or cover.

* * * * *